United States Patent [19]

De Poortere et al.

[11] Patent Number: 5,001,203

[45] Date of Patent: * Mar. 19, 1991

[54] UV CURABLE POLYORGANOPHOSPHAZENE COMPOSITION

[75] Inventors: Michel De Poortere; Suae-Chen Chang, both of Baton Rouge, La.

[73] Assignee: Ethyl Corporation, Richmond, Va.

[ * ] Notice: The portion of the term of this patent subsequent to Mar. 28, 2006 has been disclaimed.

[21] Appl. No.: 180,098

[22] Filed: Apr. 11, 1988

[51] Int. Cl.$^5$ .................... C08F 2/50; C08F 220/20; C08F 230/02; C08F 275/00
[52] U.S. Cl. ...................... 525/538; 522/96; 522/97; 526/245; 526/276; 558/157
[58] Field of Search .................. 522/142, 90, 96, 97; 525/538; 526/245, 276

[56] References Cited

U.S. PATENT DOCUMENTS

| | | | |
|---|---|---|---|
| 4,006,125 | 2/1977 | Reynard et al. | 528/168 |
| 4,221,904 | 9/1980 | Hergenrother et al. | 528/363 |
| 4,242,491 | 12/1980 | Hergenrother et al. | 528/168 |
| 4,579,880 | 4/1986 | Ohashi et al. | 523/116 |
| 4,661,065 | 4/1987 | Gettleman et al. | 523/120 |
| 4,771,112 | 9/1988 | Engelbrecht et al. | 525/328.7 |
| 4,816,532 | 3/1989 | Chang | 525/538 |

*Primary Examiner*—John C. Bleutge
*Assistant Examiner*—Arthur H. Koeckert

[57] ABSTRACT

A composition comprising a polyorganophosphazene having at least some N-(acryloxyhydrocarbyl)carbamyloxyhydrocarbyloxy groups and an amount sufficient to impart cure of an aliphatic or aromatic poly acrylate ester can be cured by irradiation of the composition with ultraviolet light.

11 Claims, No Drawings

UV CURABLE POLYORGANOPHOSPHAZENE COMPOSITION

BACKGROUND

Polyorganophosphazenes are polymers having a backbone of alternating phosphorus and nitrogen atoms and for this reason have been referred to as "inorganic polymers." Each phosphorus, however, carries two substituent groups which can be inorganic, e.g. chlorine, or organic, e.g. phenoxy. The polymers may be low molecular weight such as cyclic trimers, tetramers and the like or oligomers containing about 3–20 repeating $-P=N-$ units. The more useful polymers are the high molecular weight open-chain polymers such as those described in U.S. Pat. No. 3,515,688; U.S. Pat. No. 3,702,833; U.S. Pat. No. 3,856,712 and U.S. Pat. No. 3,856,713. These polymers are soluble in solvents such as tetrahydrofuran, (THF), cyclohexane, toluene, etc. but can be cured (i.e., cross-linked) to insoluble polymers by means such as sulfur vulcanization or free-radical (e.g., peroxide) catalysts. Curing is more readily accomplished if the soluble polymer contains some olefinically unsaturated groups such as ortho-allylphenoxy (e.g., U.S. Pat. No. 3,970,533; U.S. Pat. No. 3,972,841 and U.S. Pat. No.4,116,785).

Reynard et al. U.S. Pat. No. 3,948,820 describe open-chain polyorganophosphazenes having hydroxy substituents which can be cross-linked by reaction with organic diisocyanates, e.g., toluene diisocyanate, to form a urethane-type cross-link. Reynard et al. U.S. Pat. No. 4,006,125 describes similar polymers wherein the hydroxy-substituted polyorganophosphazene is reacted with an excess of organic polyisocyanate such that the polymer is not cross-linked but is substituted through a urethane-type bond with an isocyanate terminated side chain. Such polymers can be cured by a small amount of water such as is present in moist air.

SUMMARY OF THE INVENTION

It has now been discovered that compositions that contain (a) polyorganophosphazenes which have a small amount of N-(acryloxyhydrocarbyl)carbamyloxyhydrocarbyloxy substituents and (b) a polyacrylate or methacrylate ester of an aliphatic or aromatic polyol can be readily cured by exposure to ultraviolet radiation.

DESCRIPTION OF THE PREFERRED EMBODIMENTS

A preferred embodiment of the invention is a curable polyorganophosphazene composition comprising (A) a cyclic or open-chain polyorganophosphazene which comprises 3–50,000 units having the structures:

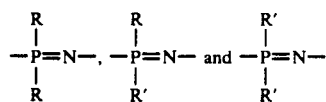

wherein R is a substituted or unsubstituted alkyl, cycloalkyl, aryl, alkoxy, cycloalkoxy, or aryloxy or mixtures thereof and $R^1$ is a substituent having the formula:

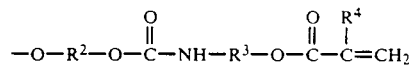

wherein $R^2$ and $R^3$ are divalent hydrocarbon groups containing 2–12 carbon atoms and $R^4$ is hydrogen or methyl and at least some of said units have an R' substituent and (B) a cross-linking amount of a poly acrylate ester having the formula:

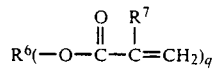

wherein $R^6$ is an aliphatic or aromatic group having valence q, $R^7$ is hydrogen or methyl and q is an interger from 2 to 4.

The uncured polyorganophosphazene may be cyclic or open-chain. Cyclic polyorganophosphazenes contain from 3 up to 20 repeating

units. The most common cyclics are trimers and tetramers, especially trimers.

Open-chain polyorganophosphazene can contain from about 3 up to 50,000 or more

units. The lower molecular weight polymers contain about 3–20

units are referred to as oligomers. These open-chain polymers are mainly linear although some branching may occur. The polymers are not cross-linked and are soluble in solvents such as tetrahydrofuran, benzene, toluene, cyclohexane, dioxane, dimethoxyethane and the like.

Substituent groups represented by R can be substituted or unsubstituted alkyl (e.g., methyl, ethyl, n-propyl, isopropyl, n-hexyl, 2-ethylhexyl-n-dodecyl, 2-chloroethyl, 2-fluoroethyl, phenethyl, benzyl, 2,2,2-trifluoroethyl, perfluoroethyl, 4,4,3,3,2,2-hexafluorobutyl, 2-nitroethyl 2-ethoxyethyl and the like).

Likewise substituted or unsubstituted cycloalkyl substituents may be bonded to phosphorus. Examples of these are cyclohexyl, cycloheptyl, cyclooctyl, cyclododecyl, 4-chlorocyclohexyl, 4-bromocyclohexyl, 4-fluorocyclohexyl 4-nitrocyclooctyl, 2-acetocyclohexyl, 4-acetoxycyclohexyl and the like.

Useful aryl substituents are phenyl, tolyl, naphthyl, 4-ethylphenyl, 2-allylphenyl, 4-chlorophenyl, 4-trifluoromethylphenyl, 2-nitrophenyl, 4-acetoxyphenyl, 4-methoxyphenyl and the like.

The alkoxy, cycloalkoxy and aryloxy substituents are similar to the above except are bonded through oxygen to phosphorus. Some examples are methoxy, ethoxy, 2-methoxyethoxy, polyethoxyethoxycyclohexoxy, cyclooctyloxy, benzyloxy, 2,2,2-trifluoroethoxy, 4,4,3,3,2,2-hexafluorobutoxy, 4-ethylphenoxy, 2-allylphenoxy, 4-methoxyphenoxy and the like.

An especially useful class of polyorganophosphazenes are the polyaryloxyphosphazenes. Such polymers have phenoxy and/or substituted phenoxy substituted on phosphorus. An especially useful polyaryloxyphosphazene has a mixture of both phenoxy and alkylphenoxy substituents such as 30–70 mole percent phenoxy and 30–70 mole percent 4-ethylphenoxy.

Another especially useful class of polyorganophosphazene has fluoroalkoxy substituents wherein the fluoroalkoxy groups are represented by the formula:

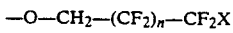

wherein n is zero or an integer from 1 to 15 and x is H or F. These are referred to as polyfluoroalkoxyphosphazene.

It really is not critical what the other organo substituents on phosphorus are as long as there are at least some, sufficient to impart cure, of the N-(acryloxyhydrocarbyl)carbamyloxyhydrocarbyloxy substituent. These have the formula:

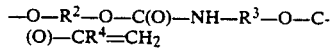

wherein $R^2$ and $R^3$ are divalent hydrocarbyl groups containing 2–12 carbon atoms and $R^4$ is hydrogen or $CH_3$. From this it is apparent that the term "acryl" is used in a generic sense to mean both the acryl group, $-C(O)-CH=CH_2$, as well as the methacryl group, $-C(O)-C(CH_3)=CH_2$. The divalent hydrocarbon group can be aliphatic, cycloaliphatic or aromatic. Some examples are: $-CH_2-CH_2-$, $-CH_2-CH(CH_3)-$, $-(CH_2)_{12}-$, 1,4-cyclohexylene, 1,4-phenylene and the like. The number of such groups is not critical as long as there are a sufficient number to impart the desired degree of cure when exposed to ultraviolet radiation. A useful range is about 0.1–50 mole percent of the total phosphorus substituent. The low molecular weight polymer, e.g. where n is about 3–10, preferably have about 33–50 mole percent of the phosphorus substituents as acrylate terminated groups whereas the high molecular weight polymers, e.g. where n is about 15,000 or higher require only about 0.1–1.0 mole percent acrylate terminated groups.

Although the other organic substituents are not critical, the properties of the final cross-linked polymer will, of course, vary depending on the nature of the other organic substituents.

The acrylate or methacrylate terminated groups may be introduced by first reacting polyphosphonitrilic chloride having the desired chain structure (i.e., cyclic or open-chain) and number of

units (i.e., 3–50,000 or more) with reagents to introduce the desired phosphorus substituents (e.g., sodium ethoxide, butyl magnesium bromide, phenyl magnesium bromide, sodium 2,2,2-trifluoroethoxide, sodium phenoxide, sodium p-ethylphenoxide and the like) in an amount which is not sufficient to react with all of the chlorine bound to phosphorus. Then the remaining chlorine can be reacted with a sodium hydroxyhydrocarbyloxide such as sodium 3-hydroxybutoxide to introduce an hydroxyalkoxy group. Alternatively, the hydroxyl terminated groups may be inserted first by reaction of the polyphosphonitrilic chloride with a sodium (or potassium) hydroxyhydrocarbyloxide followed by reaction of the remaining chlorine atoms with a different nucleophile. The methods described in Reynard et al. U.S. Pat. No. 3,948,820 and U.S. Pat. No. 4,006,125, incorporated herein by reference, can be used to introduce the hydroxyalkyloxy or hydroxyaryloxy groups. The hydroxy functional group can also be attached by a substituent exchange process involving a fluoroalkoxyphosphazene and the mono sodium salt of a diol. For example:

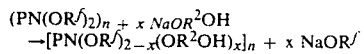

wherein (OR$^f$) is a fluoroalkoxy group.

The acrylate or methacrylate function can be obtained by reacting the hydroxyhydrocarbyloxy substituted polyorganophosphazene with an acrylate or methacrylate ester of a hydroxyhydrocarbyl isocyanate such as methacryloxyethylisocyanate. These have the structure:

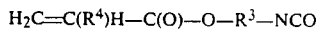

wherein $R^3$ and $R^4$ are as previously defined.

The reaction of the above isocyanate with the hydroxy-functional polyorganophosphazene is promoted by the inclusion of a conventional polyurethane catalyst such as an organotin compound, e.g., dibutyltin dilaurate.

An important function of the polyacrylate cross-linking agent is to control the viscosity of the composition so that it can be applied conveniently to the substrate with good flow to a smooth finish.

Polyacrylate esters useful in curing the foregoing polyorganophosphazene are those having the formula

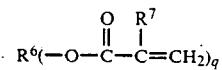

wherein $R^6$ is an aliphatic or aromatic group having valence q, $R^7$ is hydrogen or methyl and q is an integer from 2 to 4. Some examples of the polyacrylate esters are hydroquinone diacrylate, hydroquinone dimethyacrylate, pyrogallol diacrylate, pyrogallol dimethyacrylate, pyrogallol triacrylate, resorcinol diacrylate, resorcinol dimethacrylate, glycol diacrylate, glycol dimethacrylate, glycerol diacrylate, glycerol trimethacrylate, 1,1,1-trimethylol ethane triacrylate, glucose polyacrylate, pentaerythritol tetraacrylate, pentaerythritol trimethacrylate, diethyleneglycol diacrylate, triethyleneglycol dimethacrylate, propyleneglycol diacrylate and the like.

Preferably $R^6$ is an aliphatic hydrocarbon group containing 2–12 carbon atoms. Examples of these polyacrylate esters are ethylene glycol diacrylate, propylene glycol dimethacrylate 1,4-butanediol diacrylate, 1,6-hexanediol diacrylate, 1,6-hexanediol dimethacrylate, dimethylol ethane diacrylate trimethylolpropane trimethacrylate, 1,12-dodecanediol diacrylate and the like.

Still more preferably $R^6$ is an aliphatic hydrocarbon group having the structure $-(CH_2)_t-$ wherein t is an integer from 2 to 12. Good results have been achieved using 1,6-hexanediol diacrylate.

The amount of polyacrylate ester should be a crosslinking amount. This is an amount which when mixed with the polyorganophosphazene having acrylate or methacrylate terminated substituents on phosphorus will react under ultraviolet irradiation to form a cured polyphosphazene composition. The preferred amount of polyacrylate can be defined in terms of equivalents of polyacrylate ester per equivalents of polyorganophosphazene to be cured. In this context an equivalent of polyacrylate or polymethacrylate is its molecular weight or average molecular weight divided by the number or average number of acrylate or methacrylate groups per molecule. An equivalent of polyorganophosphazene is the molecular weight or average molecular weight of the polyorganophosphazene divided by the number or average number of acrylate or methacrylateterminated substituent groups per molecule.

The number of equivalents of polyacrylate ester need not equal the number of equivalents of polyorganophosphazene. This is because the polyorganophosphazene described herein is capable of cure under ultraviolet irradiation without the addition of any polyacrylate ester. This is described in a patent application filed concurrently with this application by Suae-Chen Chang and Michele De Poortere and designated Case 5747. The cured polymer of Case 5747 is different from the present polymer. At least some polyacrylate ester must be mixed with the present polyorganophosphazene to distinguish the composition from that of Case 5747. A useful ratio is about 0.1 to 1.1 equivalents of polyacrylate ester per equivalent of polyorganophosphazene. A more preferred range is about 0.5–1.0:1.0 and most preferably about 1 equivalent of polyacrylate ester per equivalent of polyorganophosphazene.

The composition including (A) the polyorganophosphazene with acrylate-terminated substituents and (B) a curing amount of a polyacrylate ester can be readily cured by irradiation with ultraviolet light. The degree of cure depends on the thickness of the material, the intensity of the ultraviolet radiation and the time of exposure. When using a conventional 500 watt mercury vapor lamp, thin films are cured in 0.5–10 minutes. Ultraviolet cure is promoted by including a small amount of benzophenone as a sensitizer. Tack of the cured product is reduced by including a small amount of an alkanol amine such as triethanol amine. The use of benzophenone and triethanol amine in acrylate crosslinking is conventional.

The preparation of the N-(acryloxy or methacryloxy hydrocarbyloxy)carbamyloxy hydrocarbyloxy-substituted polyorganophosphazenes is shown in the following example.

EXAMPLE 1

A 138.4 g portion of open-chain substantially linear polyphosphonitrilic chloride (approximately mole weight 6,000) was dissolved in 310.9 g of toluene. This solution was poured into 785.2 g n-heptane to precipitate the open chain polyphosphonitrilic chloride (120.3 g) as a brown oil leaving the cyclic oligomers in the solvent phase.

In another flask was placed 57.6 g (2.5 moles) freshly cut sodium and 1644 g dry THF. A mixture of 142.3 g (1.422 moles) of 2,2,2-trifluoroethanol and 166.86 g (0.76 moles) of a mixture $H-(CF_2-CF_2)_x-CH_2OH$ wherein x represents an integer from 1 to about 7 and 48.18 g (0.53 mole) of 1,3-butanediol was then added to the sodium over a 1-hour period at 25–45° C. Stirring was continued 2 hours at 40–45° C. and the mixture allowed to stand overnight at ambient temperature. The following day the mixture was heated to reflux to complete the reaction of the sodium.

Another reaction flask was charged with 2017.7 g (2.2195 equivalent) of the above alkoxide solution. Then 119.4 g of the above polyphosphonitrilic chloride brown oil dissolved in 310 g of dry toluene was added to the alkoxide solution over 70 minutes at 25–64° C. The mixture was then refluxed (71° C.) for 6 hours.

The reaction mixture was then neutralized to pH 6.5–7 with 7.33 g (0.075 mole) concentrated $H_2SO_4$. Then 1229 ml deionized $H_2O$ was added and the mixture transferred to a separatory funnel. The lower water layer was removed and the organic layer added to 4 l n-heptane. The yellow heptane phase was removed and the polymer washed with 300 ml heptane. The polymer was then dissolved in 287.9 g acetone and the solution pressure filtered through a Teflon® (PTFE) 0.2 micron filter. The filtrate was added to 2.5 l deionized water along with 181.5 g acetone. The aqueous phase was then decanted and the remaining polymer was washed with water.

The polymer was treated with 1303 g diethyl ether and 225.6 g acetone. The solution was then evaporated in a rotary evaporator to remove water and the residue dissolved in acetone. The acetone solution was again evaporated leaving the polymer which was again dissolved in acetone. The solvent was again evaporated in a rotary dryer (70° C./1 torr) leaving 217.65 g of a polyfluoroalkoxyphosphazene having 3-hydroxybutoxy substituents.

In another reaction flask was placed 10.52 g of the hydroxyl-functional polyphosphazene and 63.8 g THF. An 8 microliter portion of dibutyltin dilaurate (catalyst) and 0.5 g (3.22 milimole) of isocyanatoethyl methacrylate (aka methacryloxyethylisocyanate) was added and the solution was stirred overnight under nitrogen. An additional 16 microliters of tin catalyst was added and the mixture stirred for 2 more hours. The THF solvent was then removed in a rotary evaporator (45° C./1 torr) leaving 11.16 g of yellow taffy-like polymer.

The following example shows the mixing of the above Example 1 polyorganophosphazene with a polyacrylate ester and the curing of the resultant composition.

EXAMPLE 2

A 1.61 g of polymer from Example 1 was combined with 3.93 g dry THF. Then 0.15 g of benzophenone and 0.08 g of triethanolamine was added. Part of the mixture was removed for other experiments. To the remaining 4.29 g of mixture was added 1.08 g of 1,6-hexanediol diacrylate. The mixture was filtered through a 0.45 micron PTFE filter and the clear filtrate was placed on a glass microscope slide. Evaporation of the THF at room temperature left a sticky coating. The coating was exposed to ultraviolet irradiation (550 watt medium pressure mercury lamp) for 2 minutes at 7.6 cm. The coating cured to a tack-free THF insoluble coating.

The cured polyorganophosphazenes can be used as potting compounds for electrical devices. They are especially useful as coating compositions for a wide range of substrates.

We claim:

1. A curable polyorganophosphazene composition comprising (A) a cyclic or open-chain polyorganophosphazene which comprises cyclic or open chain polyorganophosphazene which comprises 3-50,000 units having the structures:

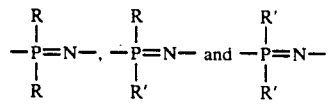

wherein R is a substituted or unsubstituted alkyl, cycloalkyl, aryl, alkoxy, cycloalkoxy, or aryloxy or mixtures thereof and R' is a substituent having the formula:

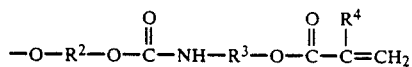

wherein $R^2$ and $R^3$ are divalent hydrocarbon groups containing 2-12 carbon atoms and $R^4$ is hydrogen or methyl and at least some of said units have an R' substituent and (B) a cross-linking amount of a polyacrylate ester having the formula:

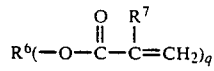

wherein $R^6$ is an aliphatic or aromatic group having valence q, $R^7$ is hydrogen or methyl and q is an interger from 2 to 4.

2. A composition of claim 1 wherein $R^6$ is an aliphatic hydrocarbon group containing 2-12 carbon atoms.

3. A composition of claim 2 wherein $R^6$ is $—(CH_2)_t—$, t is an integer from 2 to 12 and q is 2.

4. A composition of claim 3 wherein said polyacrylate ester is 1,6-hexanediol diacrylate.

5. A composition of claim 1 wherein $R^3$ is a divalent aliphatic hydrocarbon group containing 2-12 carbon atoms and $R^4$ is methyl.

6. A composition of claim 5 wherein $R^6$ is an aliphatic hydrocarbon group containing 2-12 carbon atoms.

7. A composition of claim 5 wherein $R^6$ is $—(CH_2)_t—$, t is an integer from 2 to 12 and q is 2.

8. A composition of claim 7 wherein said polyacrylate ester is 1,6-hexanediol diacrylate.

9. A composition of claim 7 wherein $R^2$ is a group having the structure

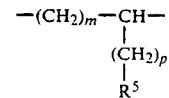

wherein m is an integer from 1 to 4, p is zero or an integer from 1 to 4 and $R^5$ is hydrogen or methyl.

10. A composition of claim 9 wherein said polyacrylate ester is 1,6-hexanediol diacrylate, p is zero and $R^5$ is methyl.

11. A cross-linked composition of claim 1.

* * * * *